2 Plates
Plate 1.

SHALTERS & RAY.
Mowing Machine.

No. 118284

PATENTED AUG 22 1871

Inventors.
M. R. Shalters.
Samuel Ray
per Burridge & Co
Attorneys

Witnesses.
J. W. Burridge
J. T. Allen

2 Plates
Plate 2.
118284

SHALTERS & RAY.
Mowing Machine.

118,284

UNITED STATES PATENT OFFICE.

MOSES R. SHALTERS AND SAMUEL RAY, OF ALLIANCE, OHIO.

IMPROVEMENT IN MOWING-MACHINES.

Specification forming part of Letters Patent No. 118,284, dated August 22, 1871; antedated August 11, 1871.

*To all whom it may concern:*

Be it known that we, MOSES R. SHALTERS and SAMUEL RAY, of Alliance, in the county of Stark, State of Ohio, have invented certain new and useful Improvements in Mowing-Machines, of which the following is a complete description, reference being had to the accompanying drawing making a part of this specification, in which—

Figure 1:
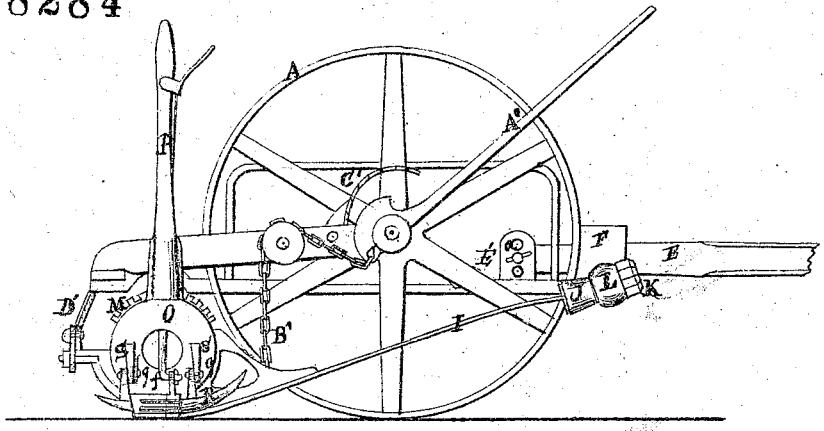
Figure 2:
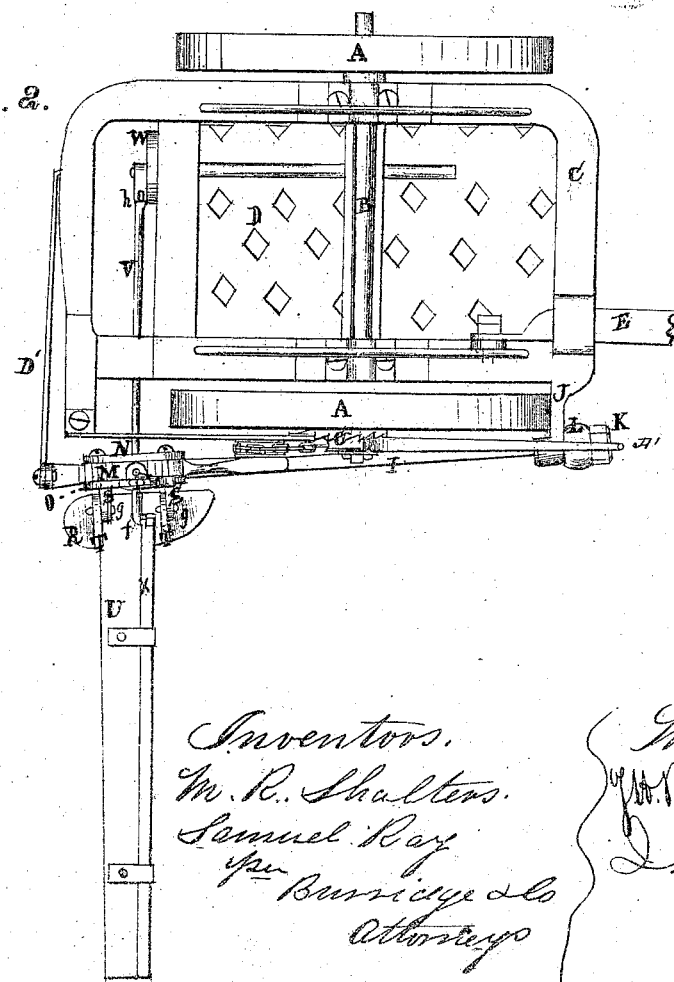
Figure 3:
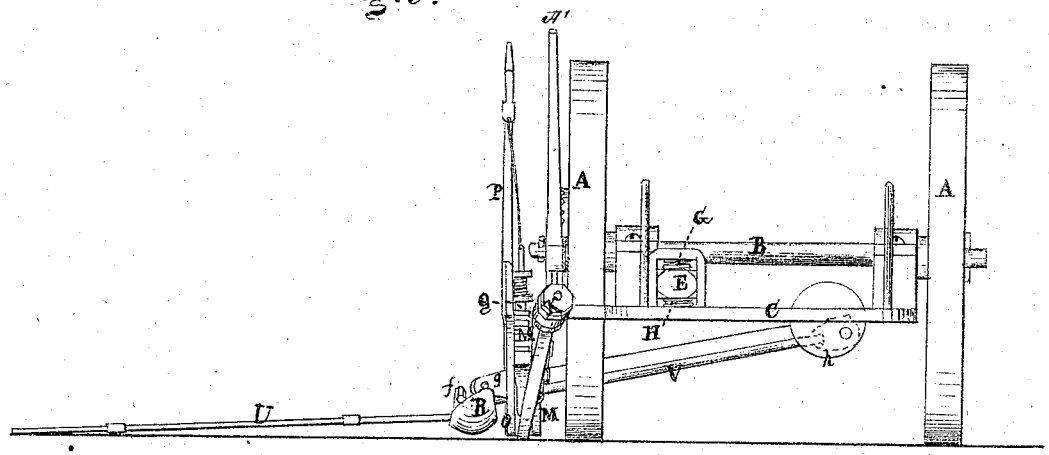
Figure 4:
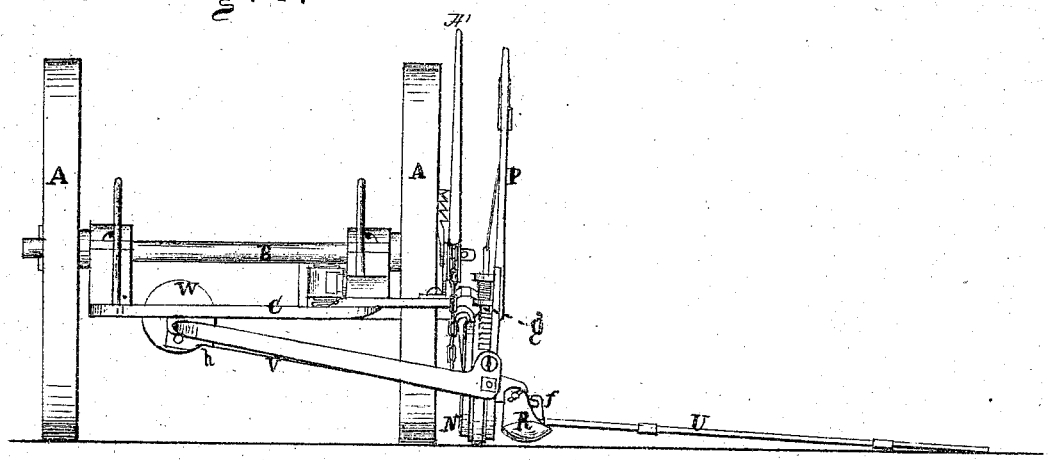

Figure 1, plate 1, is a side elevation of the machine. Fig. 2 is a plan view. Fig. 3, plate 2, is a view of the front end; and Fig. 4 is a view of the rear end.

Like letters of reference refer to like parts in the several views.

In Fig. 1, A A represent the driving-wheels of the machine, from the shaft B of which is suspended the frame C, having a perforated bottom, D. To said frame is pivoted the back end of the tongue or pole E, at the point a, Fig. 1; and it is, furthermore, secured to the frame by a stay, F, through which it loosely passes. Above and below the pole, and immediately within the stay, are springs G H, Fig. 3, the use of which will presently be shown. I, Fig. 1, is the drag-bar, the front end of which is attached to the front of the machine by an arm, J, through which it loosely passes. Between the nut K on the end of the drag-bar and the side of the sleeve of the arm through which the bar slides is interposed a rubber collar, L, the purpose of which will hereinafter be shown. The rear end of the drag-bar is connected in a rigid manner to a ratchet-wheel, M, Fig. 1, on each side of which is secured a disk, N O, Figs. 1 and 2, by means of a bush or sleeve projecting from one of said disks into and through an eye in the center of the ratchet-wheel, and to which bush the other disk is bolted or otherwise secured. By this means the two disks are made to fit closely but not tightly to the sides of the ratchet-wheel, and which admit of their being rotated by means of the lever P, Figs. 3 and 4, attached to the disk O. A pawl, Q, operated downwardly by a spring, secures the disk in any one position, when rotated, that may be desired. The purpose of rotating the disk will be shown hereafter. To the disk O is pivoted the shoe R, as shown in the drawing, Fig. 2, in which it will be seen that a pair of lugs, S, projects from the side of the disk O, and to which the shoe is pivoted by a corresponding pair of lugs, T, projecting from the shoe. By this means the shoe and the finger-bar U, Fig. 2, attached thereto, can be elevated from the ground to a vertical position, in order to avoid stumps, stones, or other obstructions that may be in the way. V, Fig. 2, is the pitman, one end of which is connected to the wrist of the wheel W, whereas the opposite end is connected to the cutter-bar X by a pivotal joint, f.

It will be observed that the axial line of the pivot f and the axial line of the pivots g, whereby the shoe is connected to the disk O, are in the same right line, or nearly so, when viewed horizontally. The advantage of this arrangement of the pivotal joints is: The pitman will work nearer in a right line with the movement of the cutter-bar horizontally, and more especially should the finger-bar be raised or depressed from a horizontal position. The pivotal joint f and the pivotal joints g all having, or nearly so, a common axial line, the pitman will work with less strain upon the cutter-bar at such times that the finger-bar may be raised above or below a horizontal position.

The rear end of the drag-bar is connected to the lower end of the lever A' by means of a chain, B', so that, on pushing said lever from the position shown to that indicated by the dotted line b, the end of the drag-bar, together with the ratchet-wheel, disks, shoe, and finger-bar, can be raised from the ground, and which may be secured at any particular elevation by the teeth of the rack C', into which the lever is made to catch, and thereby secured. D' is a brace. The upper end thereof is pivoted to the frame, whereas the lower end is connected in a rigid manner to the drag-bar. By this brace all lateral movement of the drag-bar is prevented, but which at the same time allows to it a free vertical movement.

Having thus described the construction and arrangement of the machine, the practical use of the several parts is as follows: The springs G H above referred to are for the purpose of relieving the neck of the team from severe strain in the event that the machine, while running, passes over rough and uneven ground. Stay F is placed forward of the point at which the tongue or pole E is pivoted, or attached to the frame of the machine through the raised lug E', having adjusting-holes therein to adjust the rear end of tongue, by which location of the stay the springs G H on the upper and lower sides of the tongue act with a better effect upon the tongue to prevent violent perpendicular movements at the forward end of the said tongue.

The rubber collar L referred to prevents the finger-bar from injury in the event that it may run upon some obstruction, or be subjected in any way to some unusual strain. As the bar is attached to the machine by means of the drag-bar, the drag-bar will yield to the strain in consequence of the compression of the rubber collar, and thereby save the finger-bar from being injured. The amount of the longitudinal movement of the drag-bar I is controlled by the holding and adjusting-nut K on the forward end of said drag-bar, as the nut can be turned against the rubber and obtain any degree of compression desired, thus adjusting the extent of longitudinal movement of the drag-bar. As aforesaid, the finger-bar is connected to the drag-bar by means of the disks O and N and ratchet-wheel M, so that it can turn or rotate. The finger-bar will, therefore, have a rocking or rolling transverse movement, so that the points of the fingers or guards can be raised more or less from the ground, while, when the ground is rough the guards can be elevated, and thereby prevented from running into it. Near the connection of the pitman with the wrist of the wheel W is a swivel-like joint, h, to admit of the adaptation of the pitman to the rocking motion of the finger-bar.

We are aware that various devices have been contrived for rocking the finger-bar; but such devices differ from the one mentioned, and, of course, are not claimed by us, our claim having reference only to the construction and adaptation of parts, such as we have shown and described.

What we claim as our invention, and desire to secure by Letters Patent, is—

1. The ratchet-wheel M, disks O N, in combination with the drag-bar I, these parts being constructed substantially as described, and for the purpose set forth.

2. The combination of the spring-catch lever P, ratchet-wheel M, disks O and N, drag-bar I, and shoe R with the pitman V having the swivel-joint h, the cutter-bar X, and finger-bar U, these parts being constructed and arranged in the manner and for the purpose described.

MOSES R. SHALTERS.
SAMUEL RAY.

Witnesses:
W. H. BURRIDGE,
J. H. BURRIDGE.